July 8, 1969 G. T. SHIMABUKURO 3,454,750

CHARACTER ORIENTED DATA PROCESSOR WITH FLOATING DECIMAL POINT ADDITION

Filed May 18, 1966 Sheet 1 of 3

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

United States Patent Office 3,454,750
Patented July 8, 1969

3,454,750

CHARACTER ORIENTED DATA PROCESSOR WITH FLOATING DECIMAL POINT ADDITION

George T. Shimabukuro, Monterey Park, Calif., assignor to Burroughs Corporation, Detroit, Mich., a corporation of Michigan Filed May 18, 1966, Ser. No. 551,035
Int. Cl. G06f 7/38, 7/385, 7/42
U.S. Cl. 235—159 10 Claims

ABSTRACT OF THE DISCLOSURE

There is described a character type processor of variable field length in which the decimal point position is identified by the setting of a single bit in the character adjacent to the position of the decimal point in the field. During addition, character-by-character addition goes forward in the normal manner until a decimal point bit is encountered. A counter determines the number of characters in the field between the first decimal point bit and the next decimal point bit. Addition is then repeated by effectively inserting a number of zeros into one field determined by the condition of the counter.

Figures 1, 1A:
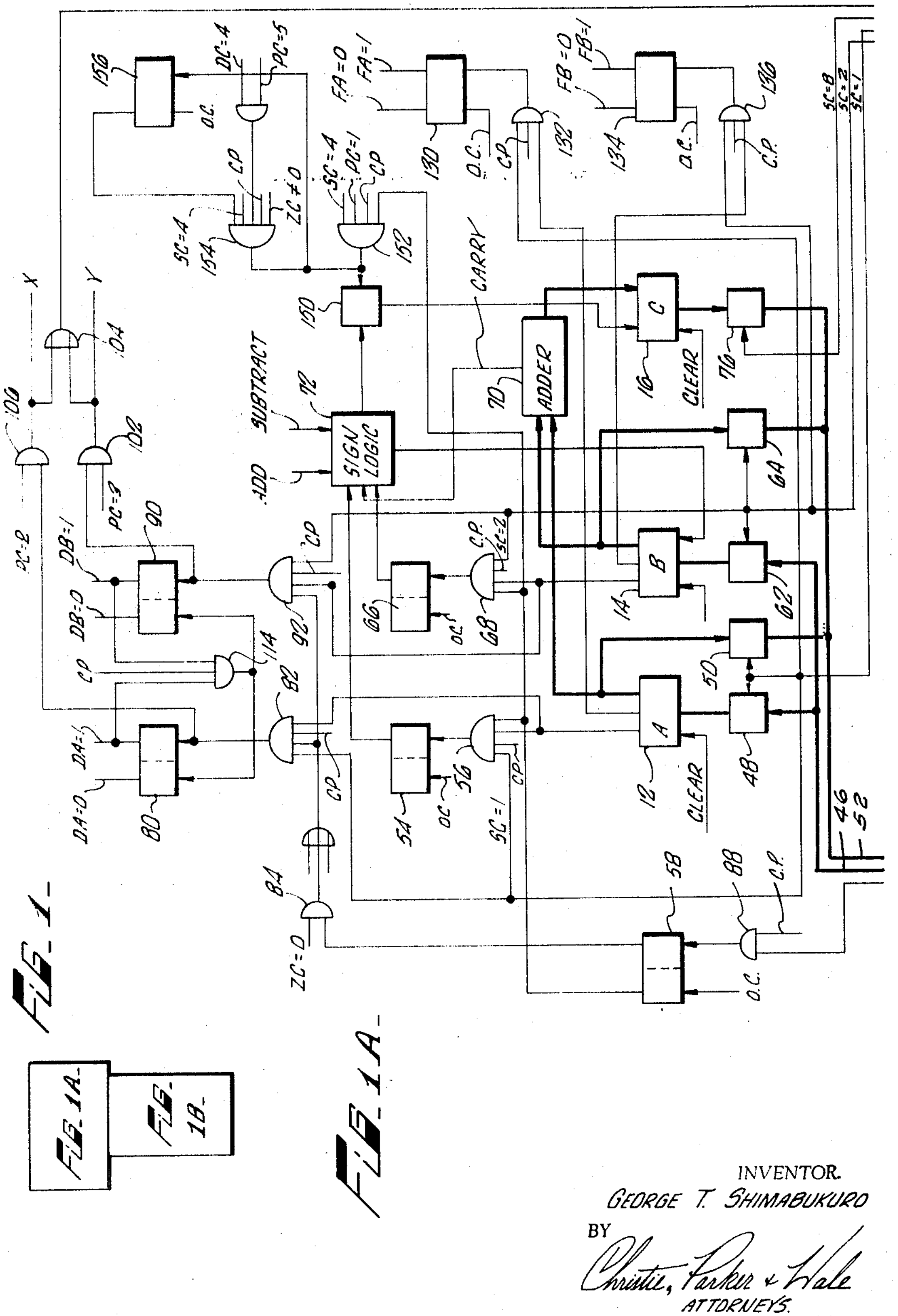

This invention relates to electronic digital computers and, more particularly, is concerned with a character oriented processor incorporating a floating decimal point.

In character oriented processors, data stored in memory is brought out a character at a time from two different designated fields in memory, an arithmetic operation is performed on the two characters, and the resultant character is returned to a third field in memory. The fields are not fixed in length but can be any length as determined by the programmer. In such a machine, the fixed decimal point position has been assumed. Conventional floating point notation in which the position of the decimal point is carried as an exponent of the base 10, as used heretofore in fixed field or word oriented machines, is much more difficult to implement in a variable field length character oriented type machine.

The present invention is directed to a character oriented processor of variable field length in which the decimal point position can be placed anywhere within the data field. This is accomplished, in brief, by providing a character format in which one bit in the character, when encountered in the least significant character of a field, designates the sign of the data contained in the field. The same bit when found in any subsequent character designates the position of the decimal point in the data contained in the field. This bit is associated with the character that is immediately to the left of the position of the decimal point, i.e., the least significant whole number. In addition, an additional bit associated with each character is used to mark the termination of the field in memory, the termination bit appearing in the most significant digit position of the field.

In performing the operation of addition or subtraction on two fields, it is assumed that the decimal points are aligned in the respective fields and addition goes forward as in conventional character oriented processors. However, this may not necessarily be the case in the processor of the present invention which permits the decimal point to be placed anywhere in the field. If an add operation is commenced starting with the two least significant digits of the two fields, one decimal point bit may be encountered before the other. If so, the decimal points are not aligned and so the arithmetic operation must be started over with the misalignment corrected. This is accomplished, in the present invention, by setting a counter according to the difference in the number of digits to the right of the decimal point in two operand fields and using the counter to insert effectively a corresponding number of zeros in one field during the subsequent operation so as to align the decimal points. Because the fields do not have to be the same length, the terminating marks may not appear at the same time. A field is no longer read when a field mark appears but the arithmetic operation continues by effectively adding the remaining digits in the other field to zero until the terminating mark in the second field is reached. At this time, the correct result of the arithmetic operation is stored in the third field in memory.

Figure 1B:
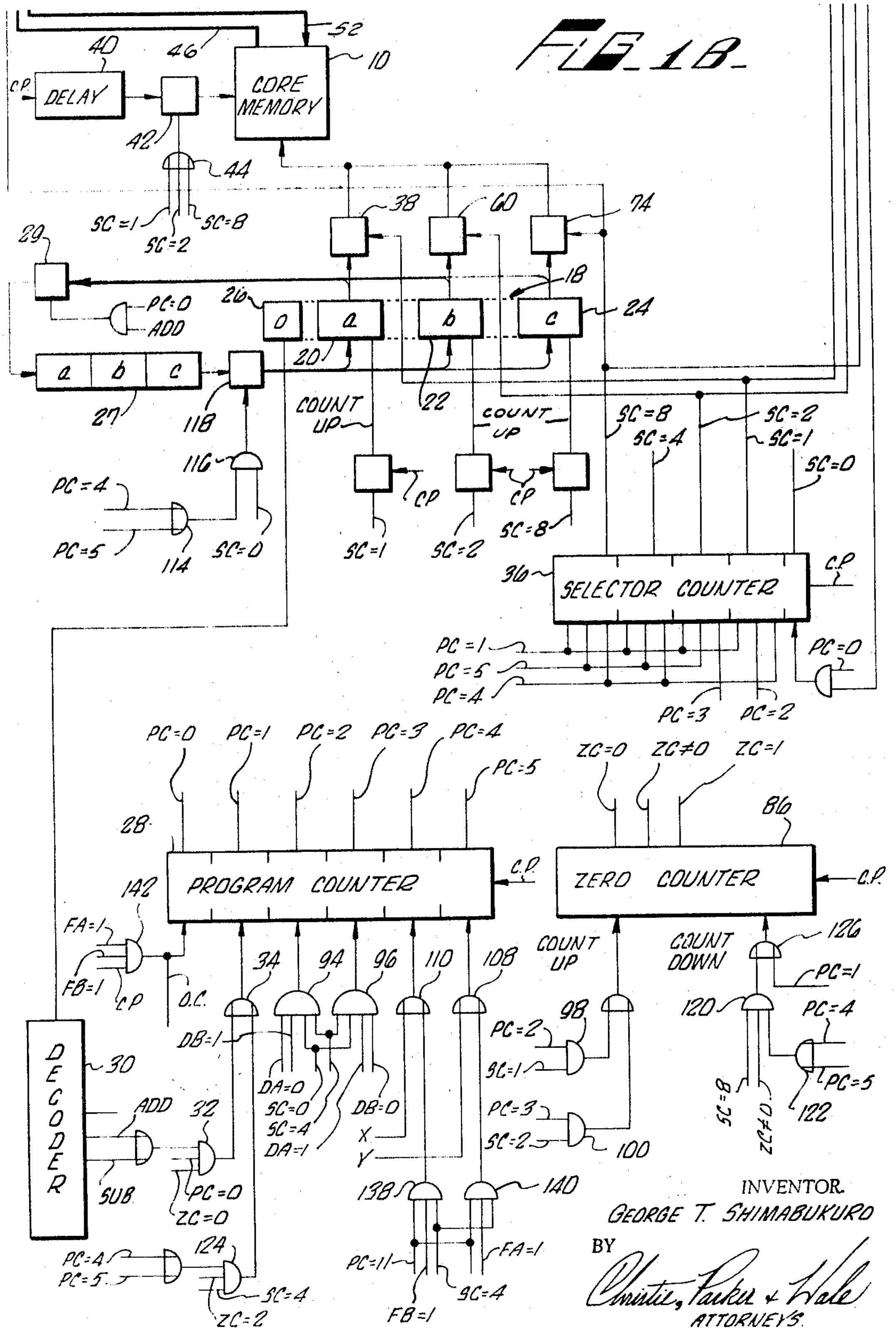
Figure 2:
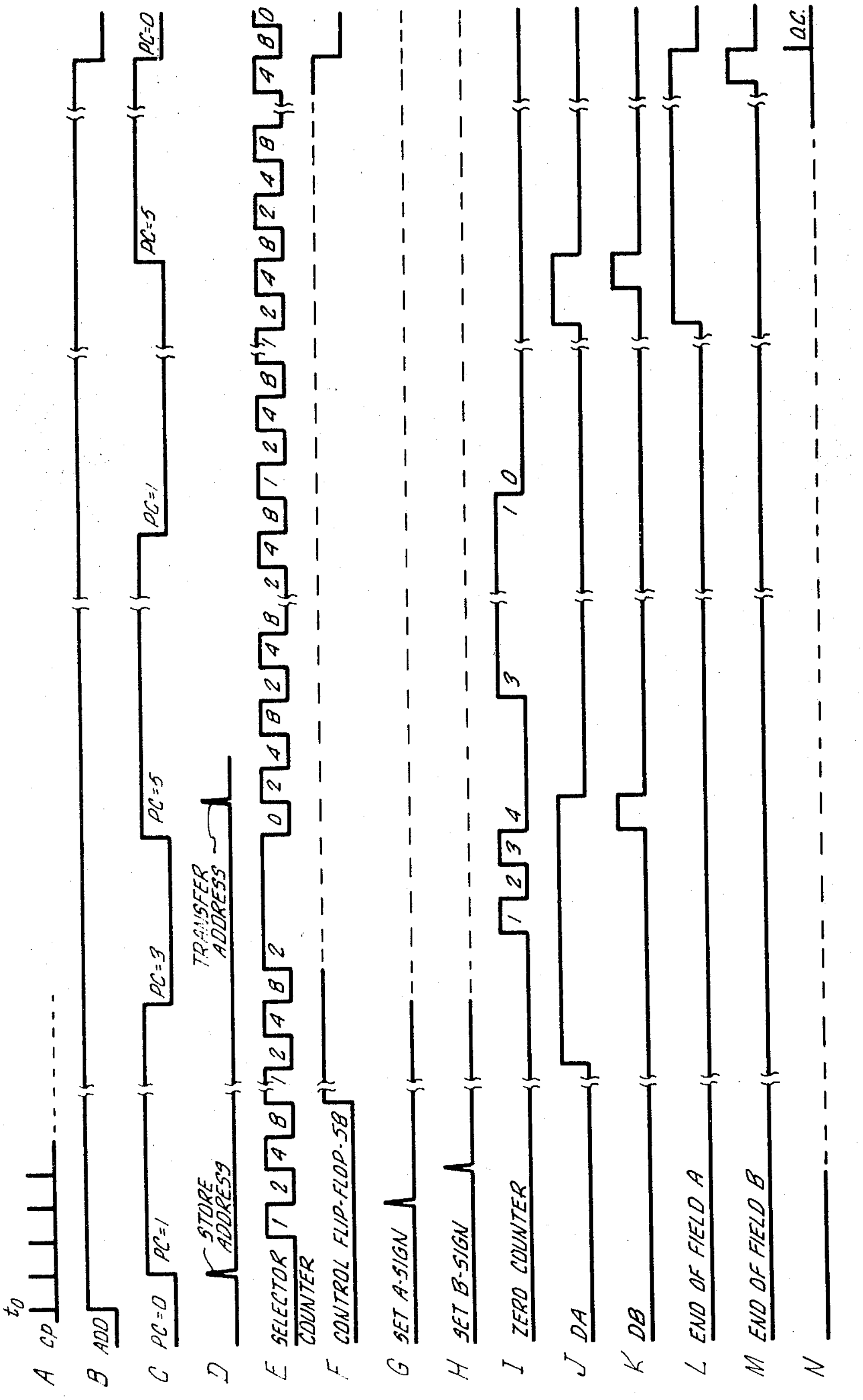

For a more complete understanding of the invention, reference should be had to the accompanying drawings, wherein:

FIGURES 1A and 1B are a schematic block diagram of one embodiment of the present invention; and FIGURE 2 is a series of waveforms used in explaining the operation of the circuit of FIGURE 1.

Referring to FIGURE 1 in detail, the numeral 10 indicates generally a magnetic core memory in which data is stored in the form of six bit characters, for example, with each character being individually addressable. Four bits of each character are the binary coded decimal digit of the operand. The fifth bit in each character, when the character is in the least significant character of a field, designates the sign of the data in the field. The same bit in any other character position in the field designates the first character to the left of the decimal point in the field. The sixth bit associated with each character designates the most significant character in the field, and since the characters are read out serially starting with the least significant digit, the sixth bit marks the termination of the operand field in memory. Characters can be read out of the core memory 10 into either of two registers 12 or 14, designated the A-register and the B-register respectively. Characters are written into the core memory 10 from a third register 16, designated the C-register. The core memory 10 is addressed from address information carried in three address sections of the command register indicated generally at 18, the three sections being designated as 20, 22, and 24. In addition, the command register 18 includes an order section 26 which designates the particular instruction to be performed.

The fetch operation in which instructions are loaded one at a time into the command register 18 from a table of instructions, normally stored in the core memory 10, has not been shown in FIGURE 1. However, such fetch operations are well known in the internally programmed computer art and no further description is believed necessary to understand the present invention. It is assumed that an instruction has been loaded in the command register 18 in which the order portion in the section 26 designates an arithmetic operation such as an add or subtract operation. The address in the section 20 points to the start of an operand field in the core memory 10 of a first operand to be used in the arithmetic operation referred to as the A-field. Section 22 contains the address pointing to the first character of a second field containing the second operand to be used in the arithmetic operation, referred to as the B-field. Section 24 contains the address at the start of the field in which the resultant of the arithmetic operation is to be stored in the core memory 10, referred to as the C-field.

To better understand the construction and operation of the invention as described in connection with FIGURE 1, it will be assumed that the order calls for an add operation and that the number in the A-field of the core memory 10 is +5.32 and the number in the B-field of the core memory 10 is +215.973472. The sum of these two numbers, to be stored in the C-field, is then +221.293472. Thus the least significant digit in both the A-field and the B-field is assumed to be a binary coded 2 with a binary 1 bit in the fifth bit position of the character to indicate the +sign. The most significant digit in the A-field is a binary coded 5 with a binary 1 bit in the fifth bit position of the character indicating that the decimal point is positioned to the right of the 5. Also the sixth bit position of the most significant character in the A-field is a binary 1, indicating that the 5 is the most significant digit in the field. In the B-field, the seventh character in the field includes a binary 1 bit in the fifth bit position indicating that the decimal point is to the right of the 5. The last character in the field includes a binary coded 2 with the sixth bit position being a binary 1 to indicate that it is the most significant digit of the B-field.

Operation of the computer is under the control of a program counter 28 which can be set to any one of a number of states designated PC=0 through PC=7 in the embodiment shown in FIGURE 1. In executing a particular instruction in the command register 18, the program counter 28 is initially in the PC=0 state.

Assuming that an instruction has been loaded in the command register 18 calling for the add operation, a decoder 30 connected to the order section 26 of the command register 18 provides a signal on the output line from the decoder 30 designated ADD. This signal is applied to a logical "and" circuit 32, together with other levels which will hereinafter be described and which are initially in a true state, and applied to the program counter 28 through a logical "or" circuit 34 to set the program counter 28 to the PC=1 condition. As shown by the timing waveforms of FIGURE 2, all operations are synchronized with a clock pulse CP as designated in waveform A of FIGURE 2. At time $t_0$ in FIGURE 2, the ADD level goes true as shown in waveform B. Since the program counter 28 is advanced in synchronism with clock pulses, the program counter is set to the PC=1 state by the next clock pulse after time $t_0$, as shown in waveform C of FIGURE 2. Also at the end of the PC=0 state, the address information in the command register 18 is set into a register 27 by a gating circuit 29 (see waveform D of FIGURE 2) to be available in the event the arithmetic operation must be repeated after decimal point alignment.

During the PC=1 state of the program counter 28, the add operation takes place on successive characters of the operands in the A and B fields of the core memory 10, with the resultant being loaded character by character into the C-field of the core memory 10. This sequence of operations is under the control of a selector counter 36. The selector counter has five states designated SC=0, SC=1, SC=2, SC=4, and SC=8. The selector counter 36 is set to any selected state in synchronism with the clock pulses CP. During the PC=0 state of the program counter 28, the selector counter is set to the SC=0 state. The PC=1 state is applied to the selector counter such that the selector counter repeatedly advances from the SC=1 state through each of the states to the SC=8 state and then back to the SC=1 state by successive clock pulses. This is shown by waveform E in FIGURE 2.

With the selector counter 36 in the SC=1 state, the address in section 20 of the command register 18 is applied through a gate 38 to the core memory 10. A clock pulse PC is applied to the memory 10 through a small delay provided by a delay circuit 40 and through a gate 42 to which the SC=1 state is also applied. The pulse applied to the core memory 10 causes the character in the addressed location of the core memory 10 to appear at an output line 46 of the core memory 10. The output line 46 is coupled through a gate 48 to which the SC=1 state of the selector counter 36 is also applied, to the A-register 12. Thus at the completion of the clock period in which the selector counter 36 is in the SC=1 state, the least significant digit of the A-field is transferred from the core memory 10 into the A-register 12. The same character is also rewritten back into the core memory 10 in the same address location through a gate 50 to which the SC=1 state is applied, the gate connecting the A-register 12 to an input line 52 of the core memory 10.

It should be noted that the clock pulse at the end of the SC=1 state is applied to section 20 to count the address up by one so as to point to the next least significant digit in the designated A-field of the core memory 10. Also at the end of the SC=1 state, the sign of the character in the A-register 12 is set into a sign flip-flop for the A-field, indicated at 54. To this end, the fifth bit position of the charcter in the A-register 12 is applied to a logical "and" circuit 56 together with the SC=1 state, a clock pulse, and the level from a control flip-flop 58 which is initially in the reset or zero state. See waveforms F and G of FIGURE 2. Thus depending upon whether the sign is *a*+ or *a*—, the flip-flop 54 will be left in the 0 state or set to the 1 state by the clock pulse at the end of the SC=1 state of the selector counter 36.

When the selector counter 36 is advanced to the SC=2 state by the next clock pulse, the same operation is repeated on the B-field of the core memory 10. Thus the address in the section 22 of the command register 18 is applied to the core memory 10 through a gate 60 which selects the least significant digit in the designated B-field of the core memory 10 and, in response to the delayed clock pulse applied to the gate 42, the least significant character of the B-field is transferred through the output line 46 to the B-register 14 through a gate 62. The same character is rewritten in the core memory 10 through a gate 64, the SC=2 state being applied to both the gates 62 and 64 to effect the transfer. The sign condition in the fifth bit position of the B-register 14 is stored in a flip-flop 66 by means of a logical "and" circuit 68 to which is applied the SC=2 state, the 0 state of the flip-flop 58 and a clock pulse CP. See waveform H of FIGURE 2. Thus the sign flip-flop 66 will be left at 0 or set to 1 depending upon the sign condition of the least significant or first digit in the B-field as read out of the core memory 10.

During the SC=4 state of the selector counter 36, the characters in the A-register 12 and B-register 14 are applied to a decimal adder 70 with the result being set in the C-register 16. A sign-logic circuit 72 senses the condition of the sign flip-flops 54 and 66, senses the carry condition of the adder 70 as well as whether an add operation or a subtract operation is being performed and determines whether the character in the B-register should be complemented or not for the addition in the adder 70.

When the selector counter 36 advances to the SC=8 state, the address in section 24 of the command register 18 is applied to the core memory 10 through a gate 74. The character in the C-register 16 is applied to the input line 52 of the core memory 10 through a gate 76 to which is applied the SC=8 state. Thus the resultant character in the C-register 16 is transferred to the least significant digit position of the C-field in the core memory 10. It should be noted that the addresses in section 22 and section 24 are also counted up by one respectively during the SC=2 state and SC=8 state of the selector counter 36 so as to advance the address to the next character locations in memory.

As shown by the waveform E of FIGURE 2, the selector counter 36 continues to cycle through the SC=1, 2, 4 and 8 states in the manner described to add successive characters in the A and B fields and store the result in the C-field of the core memory 10. This operation is continued until a character is read out of either the A-field or B-field of the core memory 10 in which the decimal point bit has been set. In the example given, this will occur with the third character of the A-field, which is a 5. Thus at the end of the SC=1 state of the selector counter 36, a decimal flip-flop 80 is set to the DA=1 state. The setting of the decimal flip-flop 80 is provided by the output of a logical "and" circuit 82 to which is applied the fifth bit condition of the A-register 12, a clock pulse and the output of a logical "and" circuit 84. The logical "and" circuit 84 senses that a zero counter 86 is in the ZC=0 state. The zero counter 86 is part of the computer control circuitry and is capable of being counted up or counted down through a series of states by clock pulses in a manner hereinafter described in detail. The zero counter 86 is initially set in the ZC=0 state until it is counted up or counted down. The flip-flop 58 is set to the 1 state by a clock pulse and the SC=8 state applied through an "and" circuit 88. Thus the flip-flop 58 is set from the 0 to the 1 state after the first or least significant digits have been added. The change in the decimal flip-flop 80 is shown by the waveform J of FIGURE 2 while the condition of the zero counter 86 is shown by the waveform I of FIGURE 2.

As selector counter 36 advances to the SC=2 state, the character in the B-field is transferred to the B-register 14. If it should also contain a decimal bit, a decimal flip-flop 90 is set to the DB=1 state. This is accomplished by a logical "and" circuit 92 to which is applied the output of the "and" circuit 84, a clock pulse and the fifth bit of the character in the B-register 14. If the flip-flops 80 and 90 are thus both set by successive clock pulses, the decimal point in the A and B-fields are aligned and the addition may continue uninterrupted character by character.

However, following the example given above, the decimal points are not aligned and the third character in the B-field therefore does not result in setting of the decimal flip-flop 90. This means that the addition cannot continue but there must be a realigning of the two fields so that the decimal points are in effect aligned and the addition can be repeated. To this end, when one or the other of the decimal flip-flops 80 or 90 is set to 1 while the other remains at zero, the program counter 28 is changed from the PC=1 state to either the PC=2 or PC=3 states. Thus the program counter 28 is set to the PC=2 state in response to the output of a logical "and" circuit 94 which senses that the decimal flip-flop 80 is in the DA=0 state, that the decimal flip-flop 90 is in the DB=1 state, that the zero counter 86 is in the ZC=0 state and that the selector counter 36 is advanced to the SC=4 state. The program counter 28 is alternatively set to the PC=3 state by the output of a logical "and" circuit 96 which senses that the decimal flop-flop 80 is in the DA=1 state, while the flip-flop 90 is in the DB=0 state. Again following the example given above, since the decimal point is first encountered in the A-field, the program counter 28 is set to the PC=3 state as indicated by the waveform C of FIGURE 2.

During the PC=3 state of the program counter 28, characters are transferred out of the B-field of the core memory 10 until the decimal point is encountered. At the same time, the zero counter 86 is counted up with the transfer of each character out of the core memory 10. To this end, the selector counter 36 is set to the SC=2 state in response to the PC=3 state of the program counter 28. It should be noted that if the decimal point were encountered in the B-field first and the program counter 28 was in the PC=2 state, the operation would be identical, only the selector counter 36 would be set to the SC=1 state so that there would be successive read out of the characters from the A-field of the core memory 10.

As each character is transferred out of the B-field from the core memory 10 to the B-register 14, the zero counter 86 is counted up by one. The counting up of the zero counter 86 is initiated by the output of a logical "and" circuit 98 or the output of the logical "and" circuit 100. The logical "and" circuit 98 senses that the program counter is in the PC=2 state and that the selector counter 36 is in the SC=1 state, while the "and" circuit 100 senses that the program counter 28 is in the PC=3 state and the selector counter 36 is in the SC=2 state.

In the example given above, it will be noted that there are four more digits to the right of the decimal point in the B-field than in the A-field. Thus with the program counter in the SC=3 state, four additional digits are transferred from the B-field of the core memory 10 before the decimal point bit is encountered. When the zero counter 86 advanced to the ZC=4 state, as shown in waveform I of FIGURE 2, the digit with the decimal point bit will have been transferred to the B-register 14. This sets the decimal flip-flop 90 to the DB=1 state as shown by the waveform K of FIGURE 2. The same pulse that sets the flip-flop 90 is applied to an "and" circuit 102 together with the PC=3 state. The output of the "and" circuit 102 is applied through an "or" circuit 104 to the selector counter 36 to reset it to the SC=0 state thereby interrupting the read out of additional characters from the core memory 10. An "and" circuit 106 similarly senses when the decimal flip-flop 80 is set during the PC=2 state for resetting the selector counter 36.

The output of the "and" circuit 102, indicated at Y is applied through an "or" circuit 108 for setting the program counter 28 to the PC=5 state. Similarly, the output of the "and" circuit 106, indicated at X, is set through an "or" circuit 110 to set the program counter 28 to the PC=4 state. Thus the program counter 28 is set to either the PC=4 or PC=5 states depending upon whether the second decimal point is encountered in the A-field or the B-field. Under the present example, the program counter 28 will be at the PC=5 state.

During the PC=4 or PC=5 states, the addition operation is started over again. The zero counter is used to insert zeros into the A-register or B-register to be added to the characters read out in succession from one field of the core memory 10 to bring the decimal points into alignment. To this end, the PC=4 and PC=5 states are applied through an "or" circuit 114 to an "and" circuit 116 together with the SC=0 state of the seelctor counter 36 to operate a gate 118. This reloads the base address information into the command register 18 from the register blank to restart the add operation between the A and B-fields. During the PC=5 state of the program counter 28, the selector counter 36 does not enter the SC=1 state, so that no characters are read out of the A-field of the core memory 10. By the same token, the selector counter 36 does not enter the SC=2 state when the program counter is in the PC=4 state, so that no characters are read out of the B-field of the core memory 10 during the PC=4 state. It will be noted that the zero counter 86 ceases to count up during the PC=5 state but is counted down as each character is read out of the core memory 10. To this end, the output of an "and" circuit 120 is applied to the count down input of the zero counter 86. The "and" circuit 120 senses that when the selector counter 36 reaches the SC=8 state, the zero counter is in the ZC≠0 state and senses that the program counter 28 is in either the PC=4 or PC=5 state as applied to the "and" circuit 120 through an "or" circuit 122. Since no character is transferred to the A-register 12, this register remains cleared and so the addition takes place between a 0 in the A-register 12 and each character transferred to the B-register 14 during the PC=5 state.

When the zero counter 86 has been counted back down to the ZC=1 count condition, the last zero is inserted in the A-field during the PC=5 state. Thus when the selector counter 36 reaches the end of the SC=4 state, with the zero counter in the ZC=1 state, the program counter 28 is set back to the PC=1 state. This is accommplished by an "and" circuit 124 which senses that ZC=1, SC=4 and PC=4 or PC=5. After entering the PC=1 state, the zero counter 86 is returned to zero by applying the PC=1 state through an "or" circuit 126 to the count down input of the zero counter 86.

During the PC=1 state, addition continues character by character between the A-field and the B-field with the result being stored in the C-field in exactly the manner described above. However, the decimal points are now properly aligned and no further interruption of the addition operation occurs until one or the other of the fields encounters the most significant digit. As pointed out above, the most significant digit has an extra bit in the sixth bit position of the character. This bit when encountered in the A-register 12 sets an End-of-Field flip-flop 130. Setting the flip-flop 130 is controlled by an "and" circuit 132 which senses that the end-of-field bit is present in the A-register 12, that the selector counter 36 is in the SC=1 state and that a clock pulse is present. Similarly, if the end-of-field bit is present in the B-register 14, an "and" circuit 136 sets an End-of-Field flip-flop 134, the "and" circuit 136 sensing that the selector counter is in the SC=2 state and that the end-of-field bit is present in the B-register 14.

If at the end of the SC=4 state of the selector counter 36 in executing an add cycle, one or the other of the flip-flops 130 or 134 is set, the program counter 28 is returned to either the PC=4 or PC=5 state. This is accomplished by a pair of "and" circuits 138 and 140. The "and" circuit 138 senses that the program counter 28 is in the PC=1 state, that the End-of-Field flip-flop 130 is in the FA=1 state and that the selector counter 36 is in the SC=4. If all conditions are true, the program counter 28 is set to the PC=4 state through the "or" circuit 110. The "and" circuit 140 checks the alternative condition where the End-of-Field flip-flop 134 is set to the FB=1 state, in which case the program counter is set to the PC=5 state. In the example given, since the end of the A-field is reached first, the flip-flop 130 is the first to be turned on, thereby placing the program counter 28 in the PC=5 state. As discussed above, the PC=5 state operates to substitute a zero into the A-register 12 rather than continuing to read out characters from the A-field in the core memory 10.

When the End-of-Field bit is sensed in the second field, and both flip-flops 130 and 134 are set, the addition operation is complete. The program counter 28 is returned to the PC=0 state and an operation complete pulse O.C. is generated. This is accomplished by an "and" circuit 142 which responds to the FA=1 and FB=1 states of the flip-flops 130 and 134. The O.C. pulse resets all of the flip-flops and registers in the processor in preparation for the fetching and execution of the next instruction.

It should be noted that the sign is inserted with the first digit stored in the C-field of the core memory 10. This is accomplished by gating the output of the sign logic circuit 72 to the C-register 16 by a gate 150. The gate 150 is controlled by an "and" circuit 152 which senses when the flip-flop 58 is in the initial zero state, that the selector counter 36 is advanced to the SC=4 state and that the program counter 28 is in the PC=1 state. If the decimal points are not aligned and the add cycle has to be repeated by entering the PC=4 or the PC=5 states of the program counter 28, the gate 150 is controlled by an "and" circuit 154 which senses that the zero counter 86 is not equal to zero, that the program counter 28 is in the PC=4 or the PC=5 state, and that it is the first memory cycle following the change of the program counter into the PC=4 or PC=5 state. The latter condition is determined by a flip-flop 156 which is normally in the off or zero state, which state is sensed by the "and" circuit 154. The output of the "and" circuit 154 sets the flip-flop 156 to the 1 state which precludes any setting of the sign bit during subsequent memory cycles until the flip-flop 156 is reset at the end of the operation by an O.C.

From the above description, it will be recognized that the processor of the invention can accommodate fields of any length with the decimal point positioned anywhere within the field as desired. It is asumed that the decimal points in the two fields being added will normally be aligned and the addition will not have to be repeated. However, if it is assumed that the decimal points most likely will not be aligned, the operating time might be shorter on the average by eliminating the add and store cycles during the initial phase of the add operation and in such a case the selector counter 36 could be arranged to cycle initially only through the SC=1 and SC=2 states until the decimal bit in one of the two fields is encountered. Operation otherwise would be identical.

What is claimed is:

1. In a computer for processing data character by character in which the decimal point is coded by a special bit in a character adjacent the position of the decimal point in a field of characters, apparatus comprising data storage means, means for storing the address of the start of a first field in the data storage means, means for storing the address of the start of a second field in the data storage means, means for storing the address of the start of a third field in the data storage means, an adder, means responsive to each of said address storing means for transferring a character from the first field and a character from the second field in the memory during each transferring cycle to the adder and storing the resultant character from the adder in the third field of the data storing means, means for incrementing each of the address storing means with each cycle of said character transferring means to address the next character location in each of these fields, a counter, means for sensing the special bit identifying a decimal point in a character transferred out of the memory, means responsive to said sensing means when the first character having the special bit is encountered during a transferring cycle for activating said counter, means incrementing the counter with each transferring cycle when the counter is activated by the decimal point bit sensing means, means responsive to said sensing means for interrupting said incrementing means when the second character having the special bit is encountered, means responsive to said sensing means for resetting the address storing means to the starting addresses of the fields, whereby transfer from the two fields to the adder is repeated, and means responsive to the condition of the counter for interrupting transfer of characters from the field in which the special character was first encountered and transferring a zero together with the character from the other field to the adder during subsequent transfer cycles for a number of transferring cycles determined by the count condition of the counter.

2. Apparatus as defined in claim 1 further including means for setting the special bit in the output of the adder when said special bit is set in both characters applied to the input of the adder.

3. Apparatus as defined in claim 1 further including means for sensing a special bit in the last character of each field, and means responsive to said bit when sensed in one field for interrupting the transfer of characters from that field to the adder.

4. In a computer for processing data serially character by character from designated fields in an addressable memory, apparatus for adding a group of characters in a first variable length field in memory to a group of characters in a second variable length field in memory where the decimal point location in each field is coded by a special bit in the character immediately adjacent the position of the decimal point in the field, said apparatus comprising means for storing the base addresses of the two fields in memory, first memory control means for reading out a character from each of said fields in memory starting with said respective base addresses, said first control means transferring successive characters from each of said fields during successive transfer cycles, means receiving the characters from each field and sensing for the special bit in each character, a counter, means responsive to the special bit sensing means for activating the counter when a decimal point condition is first sensed in either field, means for incrementing the counter with each transfer cycle of the readout means after the counter is activated, means responsive to the special bit sensing means for interrupting said incrementing means when a decimal point condition is first sensed in the other field, an adder, second memory control means responsive to the interrupting of said incrementing means for reading out only one character from said other field starting with said stored base address in memory, said second control means transferring successive characters from said other field starting with said base address to a third field in memory until the number of characters transferred corresponds to the count condition of the counter, and third memory control means for applying successive characters from the first and second fields to the adder and storing the resultant characters in the third field in memory, the third memory control means being activated when the second control means is interrupted.

5. Apparatus as defined in claim 4 wherein the first memory control means transfers the characters read out of memory to the adder, the special bit sensing means including means for continuing operation of the first control means when the special bit is encountered in both characters transferred to the adder.

6. Apparatus as defined in claim 5 further including means for setting the special bit in the output of the adder when said special bit is set in both characters applied to the input of the adder.

7. Apparatus as defined in claim 5 further including means for sensing a special bit in the last character of each field, and means responsive to said bit when sensed in one field for interrupting the transfer of characters from that field to the adder.

8. In a computer for processing data serially character by character from designated fields in an addressable memory, apparatus for aligning the decimal points in an addition operation comprising means for reading out pairs of characters one character from the first field and one character from the second field in memory during successive transfer cycles starting with the base addresses of the two fields, means for sensing the presence of the decimal point bit in a character from the first field as it is read out of memory, means for sensing the presence of the decimal point bit in a character from the second field as it is read out of memory, means controlled by said sensing means for counting the number of pairs of characters read out of memory between the time the decimal point bit is sensed in one field and sensed in the other field, means responsive to the decimal bit sensing means or sensing the second decimal point bit for resetting the readout means to the base addresses of the two fields, adding means having two inputs, means activating the readout means to transfer characters from the two fields to the two inputs of the adding means, said activating means including means controlled by the counting means when the counting means has been counted up for delaying the readout and transfer of characters from the field in which the decimal point bit is first encountered by said sensing means to one input of the adding means until the number of characters transferred from the other field to the other input of the adding means corresponds to the count condition of the counting means.

9. Apparatus as defined in claim 8 further including means for storing the output of the adder, and means for setting the decimal bit in the output of the adder when the decimal point bit is encountered in both characters applied to the adder input.

10. Apparatus as defined in claim 9 further including means for sensing a special bit in the last character of each field, and means responsive to said bit when sensed in one field for interrupting the transfer of characters from that field to the adder.

References Cited

UNITED STATES PATENTS

| | | | |
|---|---|---|---|
| 3,022,006 | 2/1962 | Alrich et al. | 235—160 |
| 3,193,669 | 7/1965 | Voltin | 235—164 |
| 3,037,701 | 6/1962 | Sierra | 235—159 |

MALCOLM A. MORRISON, *Primary Examiner.*

D. H. MALZAHN, *Assistant Examiner.*

U.S. Cl. X.R.

235—176